TUNNEL DIODE DATA STORAGE

Filed Nov. 3, 1961 2 Sheets-Sheet 1

INVENTOR.
T.E. BAKER
R.I. DAY
BY F.J. Sullivan
ATTORNEY

March 8, 1966 T. E. BAKER ET AL 3,239,821

TUNNEL DIODE DATA STORAGE

Filed Nov. 3, 1961 2 Sheets-Sheet 2

INVENTOR.
T.E. BAKER
R.I. DAY
BY F. J. Sullivan
ATTORNEY

United States Patent Office 3,239,821

Patented Mar. 8, 1966

3,239,821
TUNNEL DIODE DATA STORAGE

Thomas E. Baker, Framingham, and Ronald I. Day, Wakefield, Mass., assignors to Sylvania Electric Products Inc., a corporation of Delaware Filed Nov. 3, 1961, Ser. No. 150,049
4 Claims. (Cl. 340—173)

This invention is concerned with tunnel diode memory systems for electronic computers and other data processing equipment and, particularly, with an improved means for reading out the information stored or processed in such systems.

Certain characteristics of tunnel diodes have significant potential utility in high speed electronic data processing systems. For example, the "quantum-mechanical tunneling" of majority carriers across a very thin semiconductor junction in the tunnel diode causes a characteristic peak and reverse current and in theory occurs at the speed of light. Presently available tunnel diodes switch in about one nanosecond, i.e. $10^{-9}$ seconds, and still faster speeds are expected as the art progresses. These diodes are capable of operating over wide temperature ranges and can withstand relatively large doses of nuclear-radiation, making them very useful in military systems. Also, the characteristic current-voltage curve of the tunnel diode suggests the possibility of producing two stable operating states by series connection with a load resistor and a voltage source. The load line is selected so that one stable state occurs in the peak region whereas the other occurs in the valley region. Each stable state may be assigned one of two binary values and, thus, a useful storage element may be obtained when a means for changing the state of the circuit from one state to the other and a means for sensing the state of the circuit are provided.

In spite of these desirable characteristics, however, tunnel diodes have seen limited use in electronic memories because of their low-voltage signal output. The usual arrangement of a memory matrix is in planes, with each plane comprised of horizontal rows of tunnel diodes, designated X, and vertical columns, designated Y. Going from the ZERO state in a given tunnel diode to the ONE state is accomplished by applying a current pulse of half the necessary switching amplitude to both the X and Y coordinates. The combined effect at the coordinate intersection is then sufficient to switch the diode.

The state of the tunnel diode can be sensed in a number of ways which are classified as either destructive or nondestructive. In destructive read-out a signal is applied to switch the diode to the ZERO state. If it is already in that state, no major change will occur, but if it was in the ONE state, a major change does occur and is detected by a sensing circuit. In nondestructive read-out either the static state of the circuit is sensed directly or a signal is applied to disturb the circuit and thus produce different responses for the two possible circuit conditions without changing the diode state. Many practical difficulties arise in the operation of these memories because of the accumulation of noise and spurious output resulting from "half-reading." These disturbances which are characteristic of all types of matrixed circuit arrangements are more acute in tunnel diode memories because the tunnel diode voltage output is so low that noise accumulations easily reach the voltage amplitude of a stored ONE.

Solution of this problem has been sought with some fairly effective noise canceling schemes, but at the expense of much additional equipment. Besides increasing cost, this added equipment also increases memory size and eliminates one of the major advantages of tunnel diode memories, namely compact packaging. One representative scheme involves the use of a storage tunnel diode and a read-out tunnel diode (refer. J. C. Miller, K. Li, and A. W. Lo, "The Tunnel Diode as a Storage Element," International Solid-State Circuits Conference, February 11, 1960, Philadelphia, Pa., pp. 52, 53). The read-out diode is driven into the negative-resistance region by coincidence of a ONE in the storage diode and Y–X selection pulses. Oscillation in the read-out diode is detected by a tuned amplifier. Almost perfect signal-to-noise ratio is obtained by this method, but at the expense of approximately twice the normal amount of equipment.

Another scheme involves separating each X row of tunnel diodes into halves and placing sensing transformers between them (refer. R. C. Sims, E. R. Beck, Jr., and V. C. Kamm, "A Survey of Tunnel-Diode Digital Techniques," Proceedings of the I.R.E., January, 1961, p. 138–139). The secondary winding corresponding to one half is connected in the opposite direction to that of the other half so that their ouputs are in opposition. Consequently, since half of the partial-select currents pass through the associated transformer core in one direction while the other half pass through in the other direction, their effects cancel. This technique has merit, but it operates on the assumption that all partial-select currents are equal, which is not always the case. A limitation must therefore be placed upon the number of bits that may be sensed in each row.

A third scheme involves the use of inductive coupling for each storage bit (refer. Miller, supra, p. 53). This has resulted in effective read-out in large capacity memories but the overall size is greatly increased by the inductors.

From these referenced read-out schemes which represent the present state of the art in tunnel diode memory readout, it is seen that all methods have one or more of the following disadvantages: reading of a ZERO as a ONE; effective reading at the expense of additional equipment; and, effective reading at the expense of limited memory capacity. It should also be noted that each senses voltage rather than current.

Accordingly, a primary object of the present invention is to provide an improved tunnel diode memory read-out means and one which efficiently distinguishes a ZERO from a ONE. A further object is to provide a tunnel diode read-out means which requires little additional equipment and is not bit capacity limited.

These objects are accomplished in one embodiment of the invention by a tunnel diode memory matrix with capacitance added externally to each tunnel diode, so that a current transient is produced in the diode when a ONE is read, and sensing means comprised of a high-pass filter and sense amplifier commonly connected to each diode in a memory plane to sense this transient.

Other objects, features, and embodiments of the invention will be apparent from the following description and reference to the accompanying drawings, wherein.

Figure 3:
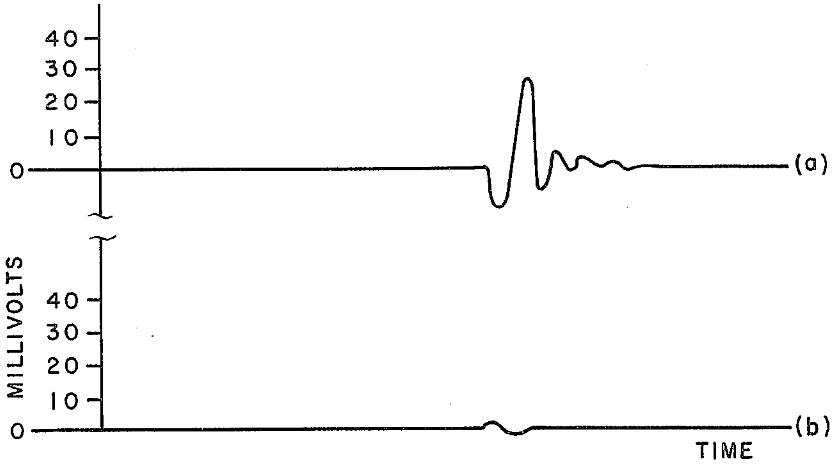
Figure 4:
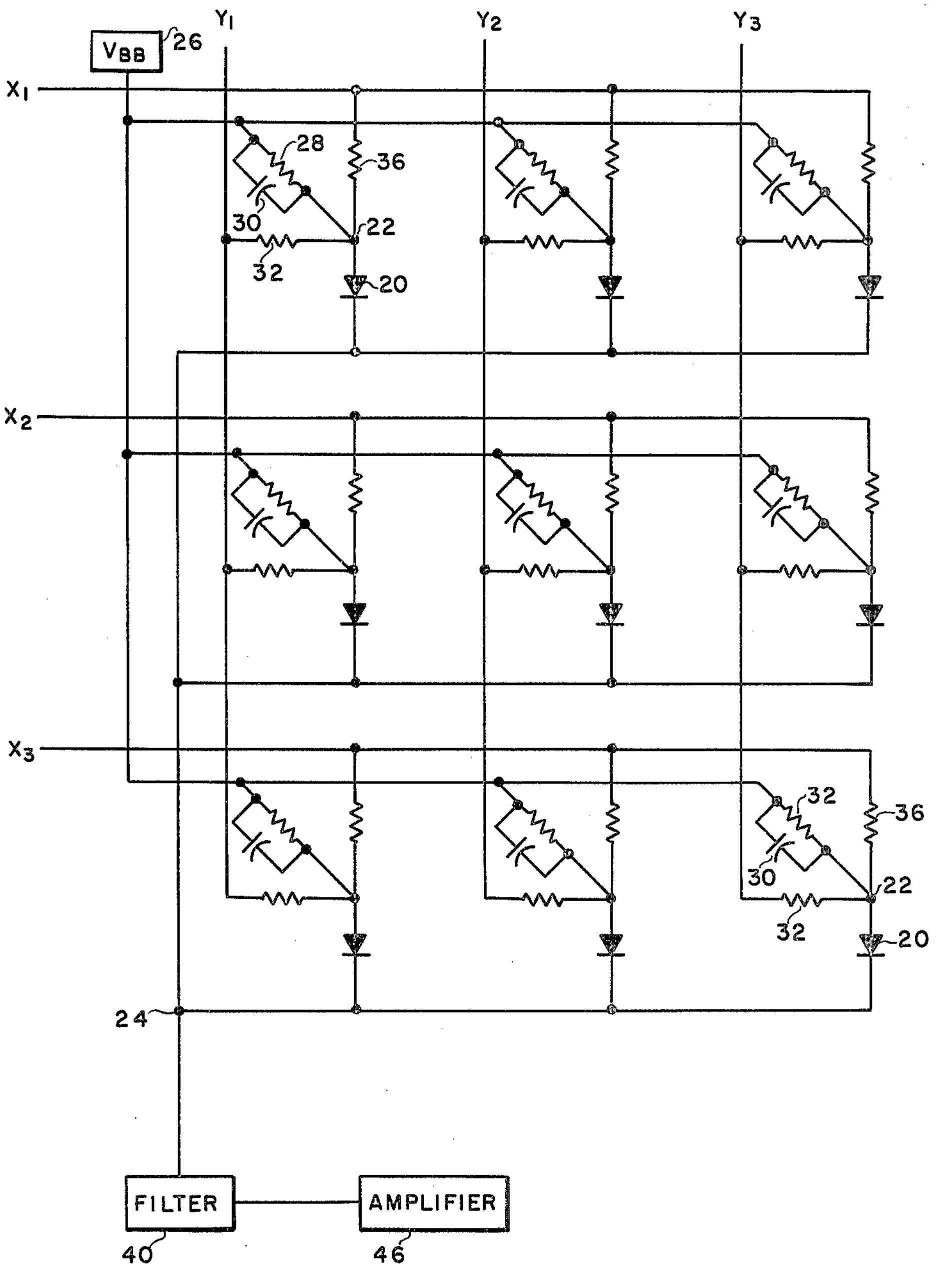

FIGURE 3*a* is a diagrammatic representation of the high-pass filter output when a ONE is read;

FIGURE 3*b* is a diagrammatic representation of the high-pass filter output when a ZERO is read; and FIGURE 4 is a diagrammatic representation of a memory plane embodying the invention.

Figure 1:
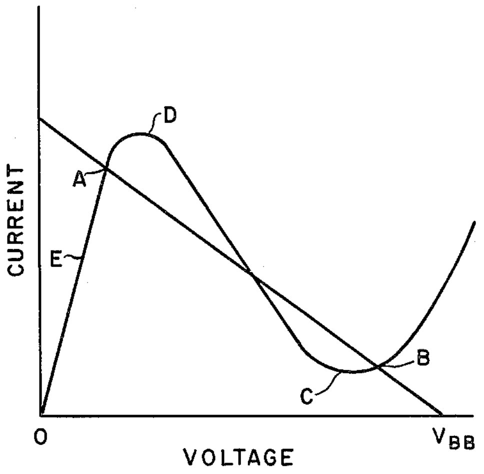
FIGURE 1 is a diagrammatic representation of the characteristic current-voltage curve of the tunnel diode.
Figure 2:
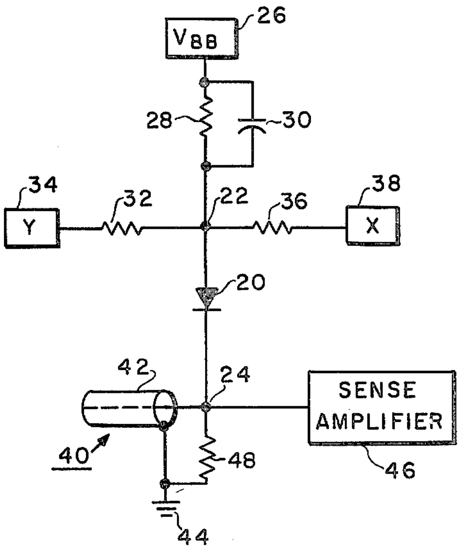
FIGURE 2 is a diagrammatic representation of a one bit memory cell utilizing the invention.

FIGURE 1 depicts the characteristic current-voltage curve of a tunnel diode and FIGURE 2 shows such a diode in a representative storage circuit. This one bit memory cell features a bistable tunnel diode 20 having its positive electrode joined to a first node 22. A bias voltage source 26 is linked to node 22 through the parallel combination of a resistor 28 and a capacitor 30. A first resistor 32 joins a Y driver 34 to node 22 and a second resistor 36 joins an X driver 38 to the same junction. A high-pass filter 40 comprised of a coaxial cable 42 has one terminal shorted to a ground connection 44, and the other terminal connected to node 24 in common with a sense amplifier 46 and a resistor 48 which is also connected to ground connection 44.

The current-voltage curve of FIGURE 1 is represented with a loadline which is determined by voltage source 26 and resistor 28 of the circuit of FIGURE 2. Point A indicates the ZERO stable state and point B indicates the ONE stable state. In order to store a ONE in tunnel diode 20, the Y driver 34 and the X driver 38 emit positive voltage pulses. The currents thus produced through resistor 32 and resistor 36 add at node 22 and cause diode 20 to switch from point A to point B. In order to store a ZERO, the Y driver 34 and the X driver 38 again emit positive voltage pulses but a Z driver and series resistor combination (not shown) transmits a current to node 22 whose value is equal to that produced in either resistor 36 or resistor 38 but of opposite polarity. The combined current effect at point 22 causes tunnel diode 20 to switch from point A towards point D, but its net value is not sufficient to cause it to pass D so that it returns to point A.

When it is desired to read a stored ONE, equal negative pulses are put out by Y driver 34 and X driver 38. Diode 20 slowly switches from point B to point C. As it reaches point C it enters the negative resistance region and quickly travels to point D. It then switches with increased speed down the positive slope towards point E, where the current is equal to the current at point A minus the magnitude of input drive current. Thus, the drive current should be long with respect to diode switching time in order to obtain maximum transient amplitude. If the tunnel diode is initially biased at point A when the read pulses are received, the tunnel diode current will travel from point A to point E and back to A with the rise and fall of input drive current. This explanation of reading is for destructive read-out.

When resistors 28, 32 and 36 are large and a ONE is being read, a very fast current transient occurs in the input resistance portion of the tunnel diode but does not appear at node 24. This transient occurs in the region between point D and point E. The time is takes for diode 20 to go from D to E is dependent on its own RC time constant where R is actually slope ED and C is tunnel diode capacity plus external capacity. Since both R and C are very small, this time is exceedingly fast and the transient results. If this current transient could be made to appear at node 24, then all such nodes in a plane could be linked together and connected to an external sensing means capable of handling such a fast transient.

This can be achieved by the addition of a capacitor external to tunnel diode 20. For convenience this capacitor 30 has been shown connected across load resistor 28; however, the desired effect may be obtained by placing it across resistor 32, resistor 36, or between note 22 and voltage source 26.

Sensing of this transient is accomplished in a high-pass filter 40 in series connection with a sense amplifier. The purpose of this filter is to remove noise and the rise and fall of the drive pulses from the transient current waveform. It also provides, at node 24, a means whereby sense amplifier 46 can provide a voltage derivitive of the transient current signal. This filter can be made to provide a short circuit at zero frequency in order to keep power at a minimum. Consequently, the shorted stub means of implementing filter 40 is very satisfactory. The stub 42 may be made of coaxial cable and is shorted to ground 44. Resistor 48 is a coaxial terminating resistor whose value is equivalent to the characteristic impedance of the line so that it limits the amount of oscillation caused by stub 42. The ONE voltage waveform, after filtering by this means, is shown in FIGURE 3*a*; and, the ZERO voltage waveform is shown in FIGURE 3*b*. From these diagrams it is apparent that a ONE may be easily distinguished from a ZERO in sense amplifier 46 because of the large spike shown in FIGURE 3*a* which corresponds to the current transient. The voltage waveforms always return to zero after each read operation so that there is no extra voltage already on the sense line when the next read begins. Thus power is kept to a minimum.

The following values and commercial identities of components are recommended for the memory read-out disclosed.

| | | |
|---|---|---|
| Potential at source **44** | volts | 0.0 |
| Potential at source **26** | do | 1.2 |
| Potentials at driver **34** | do | 0.0; +9.0; −6.0 |
| Potentials at driver **38** | do | 0.0; +9.0; −6.0 |
| Resistor **28** | ohms | 2,000 |
| Resistor **32** | do | 30,000 |
| Resistor **36** | do | 30,000 |
| Resistor **48** | do | 51 |
| Stub **42** | | 8″, RG–8U |
| Tunnel diode **20** | | ZJ56 |
| Capacitor **30** | | 10 $\mu\mu$fd. |

FIGURE 4 depicts a 9 bit memory plane using the invention. All tunnel diodes are connected in common so that only one read-out comprised of high-pass filter 40 and sense amplifier 46 is needed. Although only nine bits are shown, it is to be understood that a memory using this current transient read-out technique is not bit capacity limited and need not be of the coincident-current type as described herein. Any high-pass filter such as an inductor, a resistor capacitively coupled to the sense amplifier, or a transformer may be used. Similarly, other apparent substitutions, modifications, and embodiments of the invention are within the scope of the following claims.

What is claimed is:

1. A data storage circuit comprising, in combination, a bistable tunnel diode having first and second terminals, means connected to said first terminal for switching said tunnel diode from one stable state to the other, a capacitor connected to the first terminal of said diode and operative to produce a current transient at said second terminal in response to the diode being switched from one stable state to the other, and sensing means including a high-pass filter and a sense amplifier connected to said second terminal and operative to sense said current transient.

2. A data storage circuit comprising, in combination, a plurality of bistable tunnel diodes each having first and second terminals, means connected to the first terminal of each of said diodes for selectively switching said diodes from one stable state to the other, means including a capacitor connected to the first terminal of each of said diodes and operative to produce a current transient in its associated diode in response to the diode being switched from one stable state to the other, and sensing means including a high-pass filter and a sense amplifier connected in common to the second terminal of all of said diodes and operative to sense said current transient.

3. A data storage circuit comprising, in combination, a plurality of bistable tunnel diodes each having input and output terminals, means connected to the input terminal of each of said diodes for selectively switching said diodes from one stable state to the other, means including a capacitor connected to the input terminal of each of said diodes and operative to produce a current transient in its associated diode in response to the diode being switched from one stable state to the other, means commonly connecting the output terminal of all of said diodes, and a single sensing circuit connected to said common connecting means and operative to sense said current transient.

4. A data storage circuit comprising, a matrix of tunnel diodes each having positive and negative electrodes and arranged in a plurality of rows and columns, a like plurality of first drive conductors each connected to the positive electrodes of all of the tunnel diodes in a respective row, a like plurality of second drive conductors each connected to the positive electrodes of all the tunnel diodes in a respective column, means for applying pulses to said drive conductors of suitable magnitude to switch selected ones of said diodes from one stable condition to the other, a common source of potential, means including a capacitor connecting the positive electrode of each of said diodes to said common source of potential and operative in response to its associated diode being switched from one stable condition to the other to produce a current transient in that diode, a direct connection commonly connecting the negative electrode of all of said tunnel diodes, and a single sensing circuit including a high-pass filter and a sense amplifier connected to said direct connection and operative to sense said current transient.

References Cited by the Examiner

UNITED STATES PATENTS

| | | | |
|---|---|---|---|
| 2,975,377 | 3/1961 | Price | 331—96 |
| 3,089,126 | 5/1963 | Miller | 340—173 |
| 3,097,312 | 7/1963 | Miller | 307—88.5 |

OTHER REFERENCES

Digest of Technical Papers 1960 Solid States Circuit Conference, pp. 52–53, Feb. 11, 1960.

IRVING L. SRAGOW, *Primary Examiner.*